United States Patent
Adams et al.

(10) Patent No.: US 11,388,179 B2
(45) Date of Patent: Jul. 12, 2022

(54) CENTRALIZED THREAT INTELLIGENCE

(71) Applicant: Wells Fargo Bank, N.A., San Francisco, CA (US)

(72) Inventors: Chad E. Adams, Fairview Heights, IL (US); Daniel Robert Caricato, Fort Mill, SC (US); Kahlidah B. Covington, Kannapolis, NC (US); Ashley Brook Godfrey, Chambersburg, PA (US); Christopher Wayne Howser, Concord, NC (US); Nicola A. Maiorana, Charlotte, NC (US); Nirali J. Patel, Pineville, NC (US); Richard Joseph Schroeder, Charlotte, NC (US); Roger Daryll White, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 134 days.

(21) Appl. No.: 16/868,194

(22) Filed: May 6, 2020

(65) Prior Publication Data

US 2021/0352088 A1    Nov. 11, 2021

(51) Int. Cl.
*H04L 29/06* (2006.01)
*H04L 9/40* (2022.01)
*G06F 21/44* (2013.01)

(52) U.S. Cl.
CPC .......... *H04L 63/1416* (2013.01); *G06F 21/44* (2013.01); *H04L 63/0876* (2013.01)

(58) Field of Classification Search
CPC .. H04L 63/1416; H04L 63/0876; G06F 21/44
See application file for complete search history.

(56) References Cited

U.S. PATENT DOCUMENTS 8,412,605 B2    4/2013 Griffin et al.
8,800,034 B2    8/2014 McHugh et al.
(Continued)

FOREIGN PATENT DOCUMENTS

WO    WO-2018129373 A1    7/2018

OTHER PUBLICATIONS

"AlienVault Threat Intelligence", [Online]. Retrieved from the Internet: <URL: https://www.alienvault.com/solutions/threat-intelligence>, (Accessed Mar. 23, 2021), 5 pgs.

(Continued)

*Primary Examiner* — Jason K Gee
(74) *Attorney, Agent, or Firm* — Schwegman Lundberg & Woessner, P.A.

(57) ABSTRACT

Systems and techniques for centralized threat intelligence are described herein. A connection may be established to a plurality of threat data sources. An anonymized set of threat data may be obtained by application of a set of privacy rules to the threat data from the plurality of threat data. A threat database may be populated with the anonymized set of threat data. A registration request may be received for a user of a device. A unique user identifier may be assigned for the user and a unique device identifier may be assigned for the device. A threat model may be generated based on a set of the characteristics from the threat database. A set of data access attributes may be received for a data access request. The data access request may be blocked based on an evaluation of the data access attributes using the threat model.

24 Claims, 4 Drawing Sheets

(56) References Cited

U.S. PATENT DOCUMENTS

| | | | |
|---|---|---|---|
| 8,925,056 B2 | 12/2014 | Nikankin | |
| 9,258,321 B2 | 2/2016 | Amsler et al. | |
| 9,516,053 B1 * | 12/2016 | Muddu | H04L 63/1416 |
| 9,639,678 B2 | 5/2017 | Moore | |
| 9,852,276 B2 | 12/2017 | McEvoy et al. | |
| 10,019,744 B2 | 7/2018 | Adjaoute | |
| 10,366,129 B2 | 7/2019 | Gordon et al. | |
| 2013/0197998 A1 * | 8/2013 | Buhrmann | G06Q 20/4016 |
| | | | 705/14.53 |
| 2015/0373043 A1 * | 12/2015 | Wang | G06F 21/6254 |
| | | | 706/12 |
| 2016/0112445 A1 | 4/2016 | Abramowitz | |
| 2019/0057201 A1 | 2/2019 | Sahoo | |
| 2019/0095919 A1 | 3/2019 | Legault et al. | |

OTHER PUBLICATIONS

"Consortium Networks Announces General Availability of Consortium Z Threat Intelligence Platform", Consortium Networks, LLC, [Online], Retrieved from the Internet: <URL: https://www.globenewswire.com/news-release/2019/03/26/1768410/0/en/Consortium-Networks-Announces-General-Availability-of-Consortium-Z-Threat-Intelligence-Platform.html>, (Mar. 26, 2019), 2 pgs.

"Microsoft uses threat intelligence to protect, detect, and respond to threats", Microsoft Corporation, (Sep. 2018), 11 pgs.

Zrahia, Aviram, "Threat intelligence sharing between cybersecurity vendors: Network, dyadic, and agent views", Journal of Cybersecurtiy, vol. 0, No. 0, [Online], Retrieved from the Internet: <URL: https://academic.oup.eom/cybersecurity/article/4/1/tyy008/5245383>, (Dec. 13, 2018), 1-16.

* cited by examiner

CENTRALIZED THREAT INTELLIGENCE

TECHNICAL FIELD

Embodiments described herein generally relate to cyber threat mitigation and, in some embodiments, more specifically to centralized threat intelligence management.

BACKGROUND

Cyberthreats increase as more transactions are completed electronically. Examples of cyberthreats may include the use of fraudulent information to gain access to user information, theft via computing devices based on data obtained via social engineering attacks, and the like. Information regarding known attacks may be used to prevent future attacks. For example, internet protocol (IP) addresses of computing devices used to perpetrate attacks may be tracked and future attack attempts from the IP addresses linked to prior attacks may be thwarted by preventing data access.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
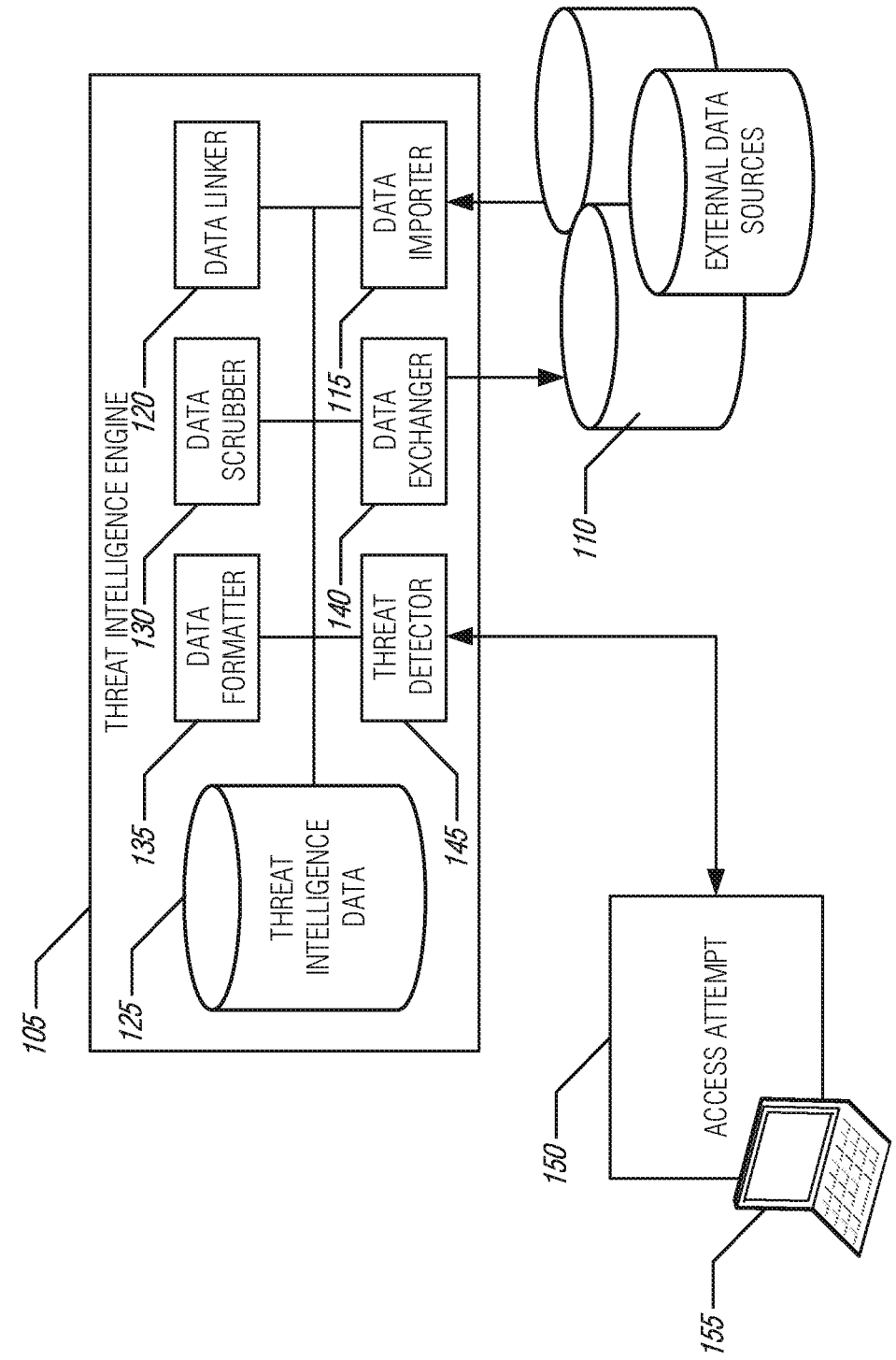
FIG. 1 is a block diagram of an example of an environment and a system for centralized threat intelligence, according to an embodiment.

Computer-based cyberattacks may be perpetrated against any entity that provides network accessible data. Complex attackers may be able to subvert security controls that an entity may employ to prevent cyberattacks. For example, an attacker may use technology to mask an IP address of a computing device used to attempt an attack. The attacker may also overcome verification routines by intercepting verification codes or other authentication information. In some instances, the attacker may conduct phishing attacks or social engineering attacks to gain information from a user or an employee of the entity that may be used to fraudulently authenticate with a data system.

An entity may track successful and unsuccessful attacks and may use attributes of the attacks to attempt to prevent future attacks. However, the data from attacks on the entity may provide a small subset of threat data that may be used to obtain protection for the subset of threats. A centralized threat intelligence system may provide a facility for entities to share threat data making more robust threat detection is possible. A user (e.g., customer, etc.) may enroll in a data sharing service to which a consortium of organizations that are interested in threat detection are connected. A unique global identifier may be generated for the user and the user may select information they would like to share. In an example, the system may use OAuth or another authentication system to secure the user data.

The user may also register devices with the system and a device fingerprint, geolocation data, phone app usage, etc. may be stored and used by members of the consortium for validating the identity of the user. A risk score may also be generated for the user based on applications used and accounts held with entities. This information may also be used in verification of the user. The score may be derived based on a model using various site data to create a composite score. The user may then be presented with the risk score and suggestions for improving the score. The risk score may balance positive and negative factors to establish confidence. Incentives may be offered to encourage participation. Current data breaches at sites at which the user has accounts may be tracked to suggest password updates and breach information that the user may use to prevent unauthorized access to the accounts. The system may also provide a centralized two-factor code generator that may be used across entities of the consortium.

The threat intelligence system may include confidential data so a webservice (e.g., API, etc.) may be used to filter confidential data. A variety of data may be included such as IP addresses linked to the user and user devices, threat data types, time stamp sent, timestamp read, and other data that indicates who received the data and who viewed the data. The data may be blocked, a challenge may be presented, or a request may be escalated depending on the entities requesting the data and preferences of a user (e.g., customer or entity) sharing the data. In some instances, the threat data may be processed inline during a transaction (e.g., during a high dollar transaction, etc.). In an example, a financial institution may produce the data and a retailer may consume the data.

The threat intelligence system may utilize a hub and spoke architecture with each entity subscribing to the service being a spoke connected to the central repository as the hub. The data may be shared across business units of an entity so that all units are using unified threat detection data. Data may be pulled from back-end systems that provide authorization, authentication services, IP address tracking, geolocation data, identification information, etc. This may allow for real-time reporting and risk-scoring. Artificial intelligence (AI) may be used to develop weighted key performance indicators (KPIs) from physical device information, user information, header agents, velocities, payee history, etc. This may prevent entry into systems or prevent a transaction based on outlier behavior.

FIG. 1 is a block diagram of an example of an environment 100 and a system 105 for centralized threat intelligence, according to an embodiment. The environment may include the system 105, external data sources 110 communicatively coupled (e.g., via wired network, wireless network, cellular network, the internee, etc.) to the system 105, and a data access attempt 150 that may originate from a computing device 155. In an example, the system 105 may be a threat intelligence engine. The system 105 may include a variety of components including a data importer 115, a data linker 120, a threat intelligence database 125, a data scrubber 130, a data formatter 135, a data exchanger 140, and a threat detector 145.

The external data sources 110 may include a variety of data sources that are maintained by entities that store threat data. For example, financial institutions, retailers, employers, etc. may be entities that store threat information regarding attack perpetrated against their data. The threat data contained in the external data sources 110 may include attributes of attacks including user information, network identifiers, location information, process patterns, data sought in the attack, configuration of a computing device used in an attack, chronological information for an attack, etc.

The data importer 115 may establish a connection to a plurality of threat data sources (e.g., the external data sources 110). For example, a secure connection may be established between the system 105 and data stores maintained by the entities. In an example, the plurality of threat data sources may be registered with the system 105 by the data importer 115 to import data into the threat intelligence database via a data exchange protocol that defines security controls and privacy rules to be included in a set of privacy rules for obtaining threat data from the plurality of threat data sources. The external data sources 110 may include confidential data of the entities and their users. To promote participation in the consortium and to protect user privacy, security controls (e.g., authentication, authorization rules, access control lists, etc.) and privacy rules may be maintained for the entities. A data sharing protocol may be defined that includes communication policies for data exchange between the entities and the system 105. The protocol may include authentication rules, authorization rules, connection rules (e.g., using application programming interfaces (APIs), etc.) for data import and export using dissimilar data sources of the external data sources 110, and rules for implementing privacy rules.

The data importer 115 may obtain, in conjunction with the data scrubber 130, an anonymized set of threat data from the plurality of threat data sources by processing threat data from the plurality of threat data sources using a set of privacy rules to filter confidential data from the threat data. The data scrubber may maintain individual privacy rules for the member entities so that an entity may define data that may be collected by the system 105. This may provide an entity with a facility to comply with regulations (e.g., the Health Insurance Portability and Accountability Act (HIPPA), etc.) and to maintain confidential or trade secret information that the entity may not wish to share with other members of the consortium. In an example, the data scrubber 130 may maintain data transformation rules that may obfuscate shared data obtained from the external data sources to maintain privacy while still obtaining data necessary for threat detection and remediation. For example, a transformation algorithm may be used to encrypt the data and a key held by the providing entity may be needed to calculate the original values for the obfuscated data. In another example, data may be replaced with generalized replacement data. For example, a threat attribute that indicates a threat type may include an identifier of an entity that was targeted by an attack and the identifier of the entity may be stripped from the data to protect the privacy of the entity.

The data formatter 135 may populate a threat database (e.g., the threat intelligence database 125) with the anonymized set of threat data that includes characteristics of security threats. In an example, the data elements may be formatted using a set of data transformation rules to transform the data elements into a standardized data format. For example, the standardized data format may include a set of fields that describe a context of the threat including, by way of example and not limitation, a system targeted by the threat, files involved in the threat, personally identifying information used in a threat attempt, network information of a device initiating the threat, geolocation information for the device initiating the threat, etc. In an example, the threat data may include patterns detected in a data exchange corresponding to the threat. For example, a response time between a prompt and a response may be included in the threat data that may be used to determine if the threat is script-based or computer automated. The set of fields may have a standard format providing uniform thread data that may be interpreted by threat management systems of subscribed entities. The set of data transformation rules may rearrange text, concatenate fields to create a merged data field, append, propend, or trim data to maintain a standard filed value length, convert data values, etc. For example, geolocation data may be obtained as coordinates and the coordinates may be transformed to an address based on a transformation rule.

The member entities may maintain threat data in a variety of systems and in a variety of formats. The data formatter 135 may maintain data transformation rules to convert data from a source format to a standardized format for storage in the threat intelligence databased 125. The data formatter 135 may also convert data from the threat intelligence database 125 from the standardized format to an entity-specific format upon export. The data formatter 135 may include a variety of transformation and standardization rules in the data transformation rules that may define a format for, by way of example and not limitation, an originating entity, a threat data type, a timestamp that indicates when a threat included in the data elements was detected, and a timestamp that indicates an indication of a first instance of the threat.

Entities may register with the system 105 to share their data. Users may also control data to be shared by registering with the system and defining privacy setting that indicate what data form which entities they wish to share with the consortium. This is important to maintain data democracy and customer privacy. The data importer 115 may receive a registration request for a user of a device and a unique user identifier may be assigned for the user and a unique device identifier may be assigned for the device. These unique identifiers may then be accessed by the data transformation rules and may the to privacy rules to replace user identifiable information from the external data sources 110. For example, the threat data may include a username of user "Pat Doe" for an online application of an entity and the username may be replaced by the unique identifier for Pat Doe. Thus, threat data that targets specific individuals may be tracked without sharing the username of Pat Doe for the online application of the entity. Thus, in the event of a breach, the user account is not subject to release to parties with nefarious intents.

The data linker 120 may evaluate imported threat data against existing data in the threat intelligence database 125 to identify related data elements. The data linker 120 may evaluate existing data in the threat intelligence database 125 to determine matched sets between members of the existing data and members of the data elements. A linked data set may be generated for the matched sets. For example, threat data stored in the threat intelligence database 125 from entity A may have attributes that are similar to threat data imported from entity B. The two data sets from entity A and entity B may be linked in the threat intelligence database 125 providing an indication that the threats bear similarities. The link may be established by joining database records, maintaining a threat identifier that may be included in a record for each instance of a threat, cross linking the data elements from each instance of the threat, etc. In an example, machine learning and other artificial intelligence technology may be used to evaluate and classify the threat data in the threat intelligence database 125 as applicable to a particular threat, a variation of a known threat, a newly defined threat, etc.

The threat detector 145 may identify threats in past or present data access requests. The threat detector 145 may generate a threat model for the unique user identifier and unique device identifier using a set of the characteristics from the threat database that correspond to the user and the device. Additionally, or alternatively, the threat detector 145 may establish models for a variety of threats reflected in the threat data stored in the threat intelligence database 125. For example, a neural network may be trained using attributes from the threat intelligence database 125 and imported data may be evaluated by the neural network to identify if a data set is associated with a known threat. In another example, the neural network may be trained with known non-threat data and the imported data may be evaluated to identify outlying attributes that may indicate that the data set may indicate a threat that may not be known. Thus, the threat detector 145 may be able to identify threats by matching incoming data to known threats and based on attributes that vary from non-threat data.

The threat detector 145 may receive a set of data access attributes for a data access request initiated using the unique user identifier and the unique device identifier (e.g., from the access attempt 150 initiated by the computing device 155). For example, imported data may be transmitted indicating the username of Pat Doe is attempting to access data from a subscribed entity to that issued the username. The username may be translated to the unique user identifier and the data may be evaluated by the threat detector 145 to determine if the access attempt 150 indicates a threat attempt. In an example, the access request is a request for financial data from a financial institution. For example, the data for the access attempt 150 may indicate that the computing device 155 used to initiate the access attempt 150 has not been registered by Pat Doe and does not appear in the threat intelligence database 125 as a computing device used by Pat Doe. In another example, the data for the access attempt 150 may be evaluated using one or more threat models to identify whether the access attempt 150 poses a threat.

The threat detector 145 may block the data access request based on an evaluation of the data access attributes using the threat model. For example, if the evaluation of the data associated with the data access request is similar to attributes of a known threat, includes outliers from known good requests, is determined to have a probability of being a threat above a threshold, etc. the data access request may be blocked preventing access to requested data. In an example, a message may be transmitted to a user corresponding to the request indicating that the data access request has been blocked. For example, a text message may be transmitted to a registered mobile device of Pat Doe to provide an indication to the user that an access attempt has been made. In an example, the user may be presented with tips for addressing the attempt in the event it was not made by the user including changing a password, changing privacy settings, etc. In an example, the message and corresponding tips may be selected based on attributes of the data access request. For example, if the attacker had a valid password, the user may be prompted to change the password and if the attacker was able to pass two-factor authentication, registering a mobile device to receive two-factor authentication or registering a one-time passcode generation application to replace the device.

In an example, a challenge response may be transmitted to a device initiating the data access request. A response received in response to the challenge response may be validated and upon validation of the response the data access request may be completed. The threat intelligence database 125 may be updated with data elements obtained from the data access request and the response.

The data exchanger 140 may export threat data to the external data sources 110 in conjunction with the data formatter 135 and the data scrubber 130 using the data sharing protocol and data and privacy filters. An entity or user may wish to share data with the central repository of the system 105 but may want to limit data that may be exported out of the repository. Thus, the data exchanger 140 may export data from the threat intelligence database 125 according to source entity or user specified rules for data distribution. Thus, a set of data export rules may be maintained and accessed by the data exchanger 140, data formatter 135, and data scrubber 130 to control the data and format of data provided to external entities.

Figure 2:
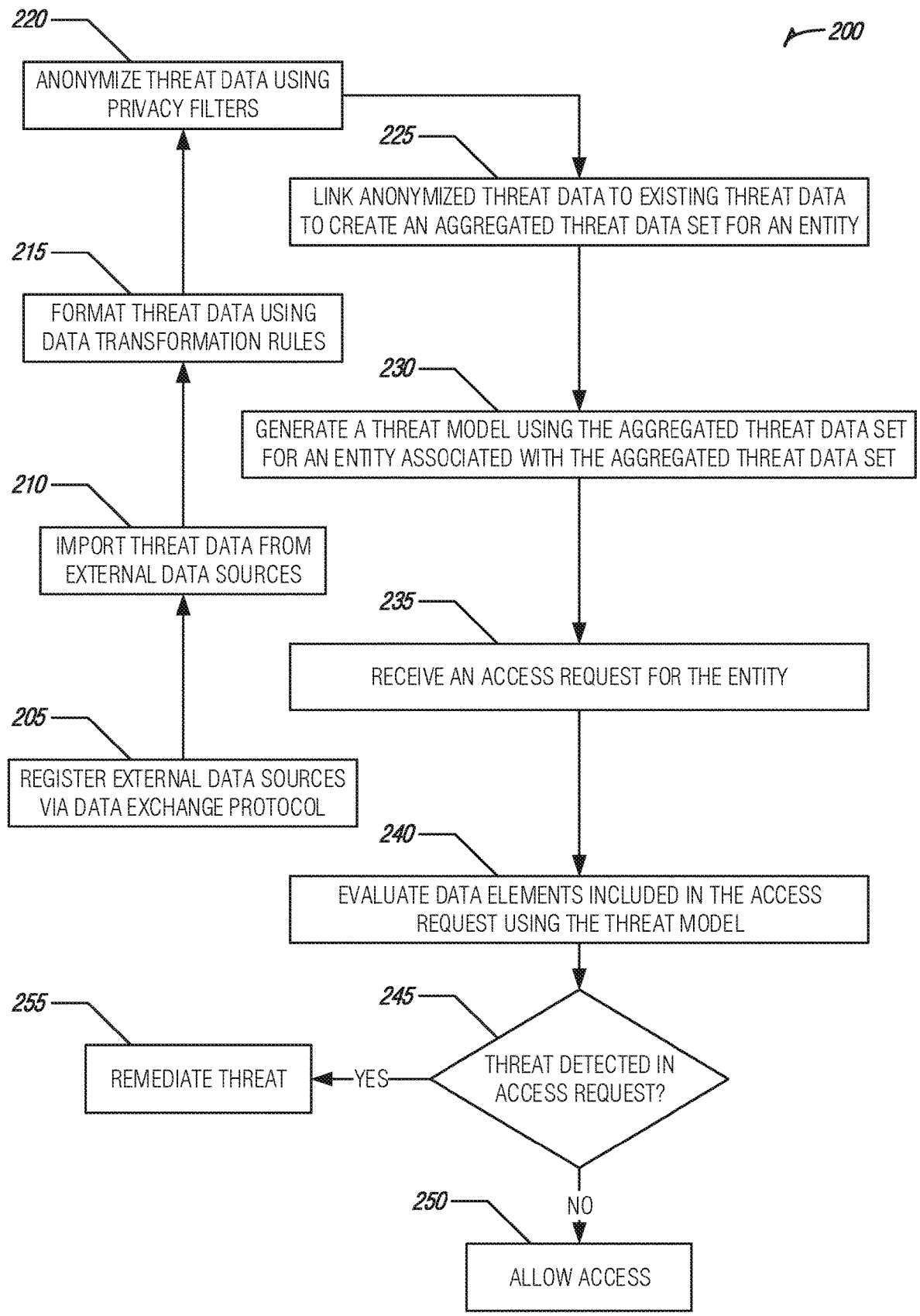
FIG. 2 illustrates a flow diagram of an example of a process for centralized threat intelligence, according to an embodiment.

FIG. 2 illustrates a flow diagram of an example of a process 200 for centralized threat intelligence, according to an embodiment. The process 200 may provide features as described in FIG. 1. External data sources may be registered (e.g., by the data importer 115 as described in FIG. 1, etc.) via a data exchange protocol (e.g., at operation 205). Threat data may be imported (e.g., by the data importer 115, etc.) from the external data sources (e.g., at operation 210). The threat data may be formatted (e.g., by the data formatter 135 as described in FIG. 1, etc.) using data transformation rules (e.g., at operation 215). The threat data may be anonymized (e.g., by the data scrubber 130 as described in FIG. 1, etc.) using privacy filters (e.g., at operation 220).

The anonymized threat data may be linked (e.g., by the data linker 120 as described in FIG. 1, etc.) to existing threat data to create an aggregated threat data set for an entity (e.g., at operation 225). A threat model may be generated (e.g., by the threat detector 145 as described in FIG. 1, etc.) using the aggregated threat data set for an entity associated with the aggregated threat data set (e.g., at operation 230).

An access request may be received (e.g., by the threat detector 145, etc.) for the entity (e.g., at operation 235). Data elements of included in the access request may be evaluated (e.g., by the threat detector 145, etc.) using the threat model (e.g., at operation 240). If a threat is detected (e.g., by the threat detector 145, etc.) in the access request (e.g., at decision 245), the threat is remediated by blocking the threat, providing a challenge, notifying the user, invoking elevated authentication routines, etc. (e.g., at operation 255). Otherwise, the data access request is allowed to continue (e.g., at operation 250).

Figure 3:
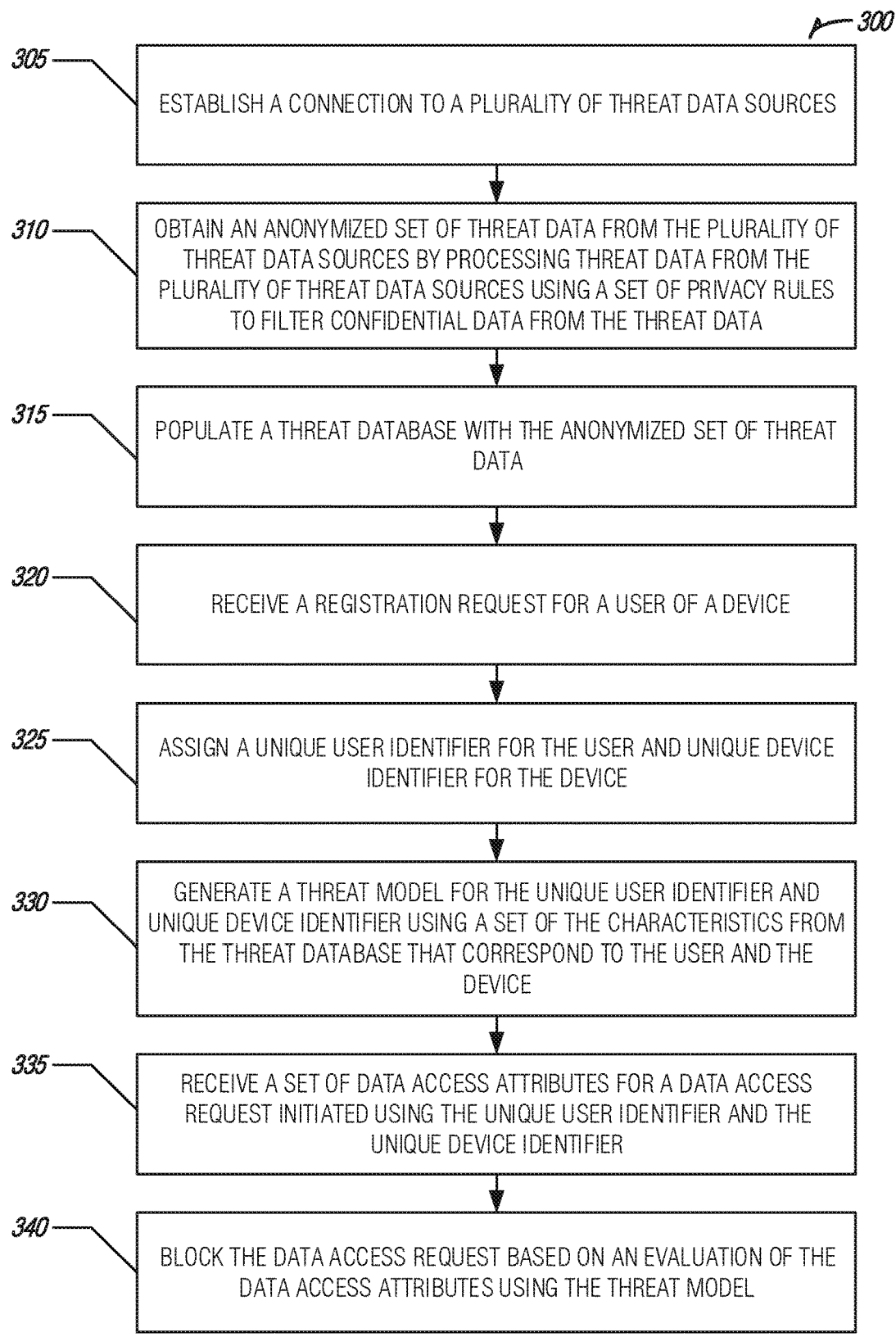
FIG. 3 illustrates an example of a method for centralized threat intelligence, according to an embodiment.

FIG. 3 illustrates an example of a method 300 for centralized threat intelligence, according to an embodiment. The method 300 may include features as described in FIGS. 1 and 2.

A connection may be established (e.g., by the data importer 115 as described in FIG. 1, etc.) to a plurality of threat data sources (e.g., at operation 305). In an example, the plurality of threat data sources may be registered with the threat database via a data exchange protocol that defines security controls and privacy rules to be included in a set of privacy rules for obtaining threat data from the plurality of threat data sources.

An anonymized set of threat data may be obtained (e.g., by the data importer 115, etc.) from the plurality of threat data sources by processing (e.g., by the data scrubber 130 as described in FIG. 1, etc.) threat data from the plurality of threat data sources using a set of privacy rules to filter confidential data from the threat data (e.g., at operation 310).

In an example, the data elements may be imported from the plurality of threat data sources.

A threat database may be populated (e.g., by the data formatter 135 as described in FIG. 1, etc.) with the anonymized set of threat data (e.g., at operation 315). The threat data may include characteristics of security threats. In an example, the threat database may be populated by addition of the data elements to the threat database. In an example, the data elements may be formatted using a set of data transformation rules to transform the data elements into a standardized data format. In an example, the set of data transformation rules may include a rule defining a format for at least one of an originating entity, a threat data type, a timestamp that indicates when a threat included in the data elements was detected, and a timestamp that indicates an indication of a first instance of the threat.

A registration request may be received (e.g., by the data importer 115) for a user of a device (e.g., at operation 320). A unique user identifier may be assigned for the user and unique device identifier may be assigned for the device (e.g., at operation 325).

A threat model may be generated (e.g., by the threat detector 145 as described in FIG. 1, etc.) for the unique user identifier and unique device identifier using a set of the characteristics from the threat database that correspond to the user and the device (e.g., at operation 330). In an example, existing data in the threat database may be evaluated to determine matched sets between members of the existing data and members of the data elements. Linked data sets may be established for the matched sets and the threat model may be generated in part by evaluation of the linked data sets.

A set of data access attributes may be received (e.g., by the threat detector 145, etc.) for a data access request initiated using the unique user identifier and the unique device identifier (e.g., at operation 335). In an example, the access request is a request for financial data from a financial institution. The data access request may be blocked based on an evaluation of the data access attributes using the threat model (e.g., at operation 340). In an example, a message may be transmitted to a user corresponding to the request indicating that the data access request has been blocked. In an example, a challenge response to a device initiating the data access request. A response received in response to the challenge response may be validated and upon validation of the response, the data access request may be completed. The threat databased may be updated with data elements obtained from the data access request and the response.

Figure 4:
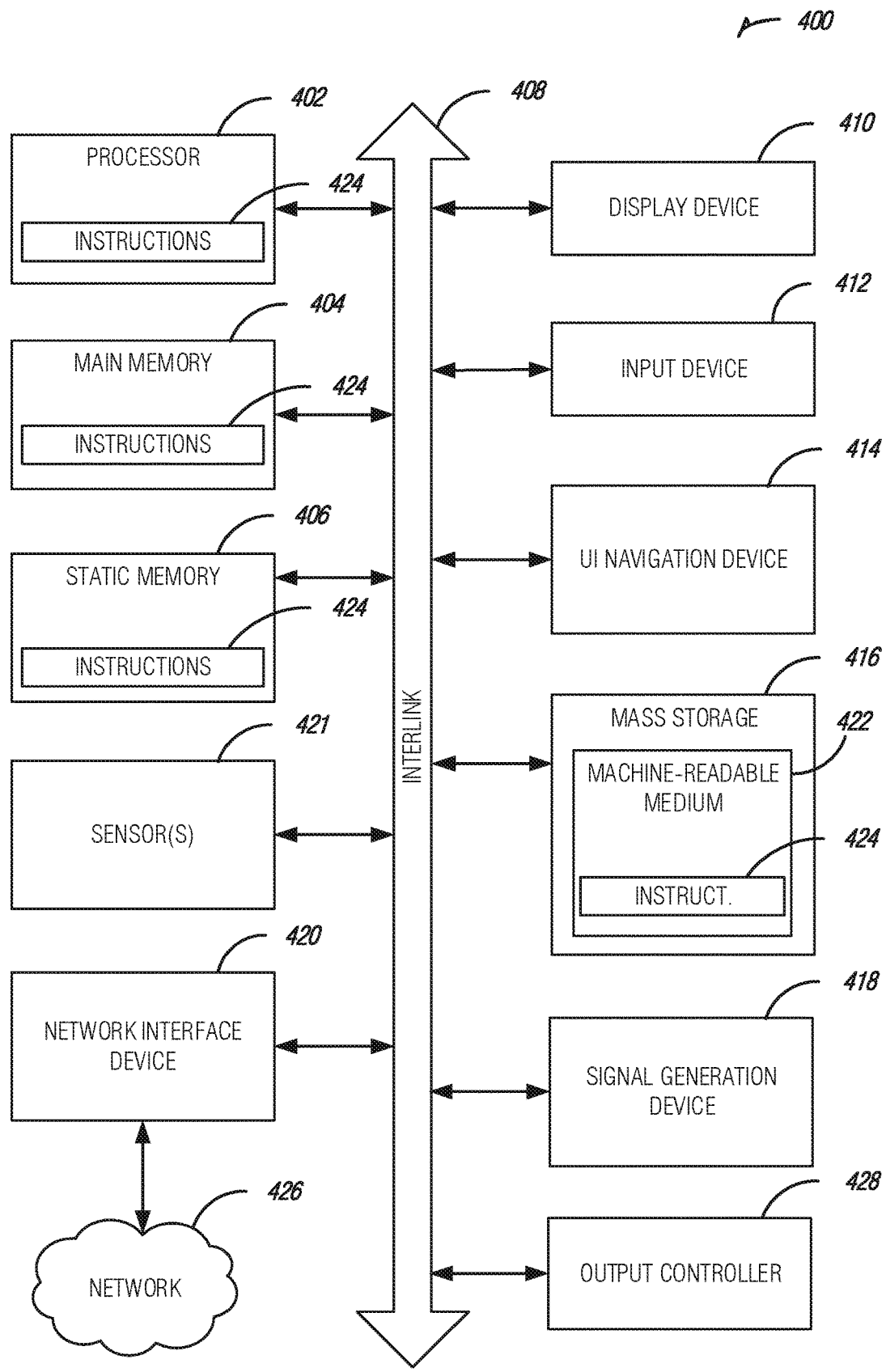
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (FDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensors. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, 3$^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced. Pro family of standards, 3GPP New Radio (NR) family of standards, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for centralized security threat detection comprising:
   at least one processor; and
   memory including instructions that, when executed by the at least one processor, cause the at least one processor to perform operations to:
   obtain a first entity privacy ruleset for a first threat data source of a first entity;
   obtain an anonymized set of threat data from the first threat data source by processing threat data from the first threat data source by filtering confidential data from the threat data using a set of privacy rules from the first entity privacy ruleset;

populate a threat database with the anonymized set of threat data, wherein the threat data includes characteristics of security threats;

receive a registration request for a user of a device;

assign a unique user identifier for the user and a unique device identifier for the device;

generate a threat model for the unique user identifier and unique device identifier based on a set of the characteristics from the threat database that correspond to the user and the device;

receive a set of data access attributes for a data access request initiated with the unique user identifier and the unique device identifier for data from a data source of a second entity, the set of data access attributes anonymized using a second entity privacy ruleset for the second entity;

block the data access request based on an evaluation of the data access attributes using the threat model; and update the threat database with the anonymized data access attributes.

2. The system of claim 1, the memory further comprising instructions that cause the at least one processor to perform operations to:

register the first threat data source with the threat database via a data exchange protocol that defines security controls and privacy rules to be included in the set of privacy rules used to obtain threat data from the first threat data source; and import data elements from the first threat data source, wherein the instructions to populate the threat database include instructions to add the data elements to the threat database.

3. The system of claim 2, the memory further comprising instructions that cause the at least one processor to perform operations to:

format the data elements by application of a set of data transformation rules to transform the data elements into a standardized data format.

4. The system of claim 3, wherein the set of data transformation rules include a rule defining a format for at least one of an originating entity, a threat data type, a timestamp that indicates when a threat included in the data elements was detected, or a timestamp that indicates an indication of a first instance of the threat.

5. The system of claim 2, the memory further comprising instructions that cause the at least one processor to perform operations to:

evaluate existent data in the threat database to determine matched sets between members of the existent data and members of the data elements; and establish linked data sets for the matched sets, wherein the threat model is generated in part by evaluating the linked data sets.

6. The system of claim 1, wherein the access request is a request for financial data from a financial institution.

7. The system of claim 1, the memory further comprising instructions that cause the at least one processor to perform operations to:

transmit a challenge response to a device that initiated the data access request;

validate a response received in response to the challenge response;

upon validation of the response, complete the data access request; and update the threat database with data elements obtained from the data access request and the response.

8. The system of claim 1, the memory further comprising instructions that cause the at least one processor to perform operations to: transmit a message to a user that corresponds to the request that indicates that the data access request has been blocked.

9. At least one non-transitory machine-readable medium including instructions for centralized security threat detection that, when executed by at least one processor, cause the at least one processor to perform operations to:

obtain a first entity privacy ruleset for a first threat data source of a first entity;

obtain an anonymized set of threat data from a first threat data source by processing threat data from the first threat data source by filtering confidential data from the threat data using a set of privacy rules from the first entity privacy ruleset;

populate a threat database with the anonymized set of threat data, wherein the threat data includes characteristics of security threats;

receive a registration request for a user of a device;

assign a unique user identifier for the user and a unique device identifier for the device;

generate a threat model for the unique user identifier and unique device identifier based on a set of the characteristics from the threat database that correspond to the user and the device;

receive a set of data access attributes for a data access request initiated with the unique user identifier and the unique device identifier for data from a data source of a second entity, the set of data access attributes anonymized using a second entity privacy ruleset for the second entity;

block the data access request based on an evaluation of the data access attributes using the threat model; and update the threat database with the anonymized data access attributes.

10. The at least one non-transitory machine-readable medium of claim 9, further comprising instructions that cause the at least one processor to perform operations to:

register the first threat data source with the threat database via a data exchange protocol that defines security controls and privacy rules to be included in the set of privacy rules used to obtain threat data from the first threat data source; and import data elements from the first threat data source, wherein the instructions to populate the threat database include instructions to add the data elements to the threat database.

11. The at least one non-transitory machine-readable medium of claim 10, further comprising instructions that cause the at least one processor to perform operations to:

format the data elements by application of a set of data transformation rules to transform the data elements into a standardized data format.

12. The at least one non-transitory machine-readable medium of claim 11, wherein the set of data transformation rules include a rule defining a format for at least one of an originating entity, a threat data type, a timestamp that indicates when a threat included in the data elements was detected, and a timestamp that indicates an indication of a first instance of the threat.

13. The at least one non-transitory machine-readable medium of claim 10, further comprising instructions that cause the at least one processor to perform operations to:

evaluate existent data in the threat database to determine matched sets between members of the existent data and members of the data elements; and establish linked data sets for the matched sets, wherein the threat model is generated in part by evaluating the linked data sets.

14. The at least one non-transitory machine-readable medium of claim 9, wherein the access request is a request for financial data from a financial institution.

15. The at least one non-transitory machine-readable medium of claim 9, further comprising instructions that cause the at least one processor to perform operations to:

transmit a challenge response to a device that initiated the data access request; and validate a response received in response to the challenge response;

upon validation of the response, complete the data access request; and update the threat databased with data elements obtained from the data access request and the response.

16. The at least one non-transitory machine-readable medium of claim 9, further comprising instructions that cause the at least one processor to perform operations to transmit a message to a user that corresponds to the request that indicates that the data access request has been blocked.

17. A method for centralized security threat detection comprising:

obtaining a first entity privacy ruleset for a first threat data source of a first entity;

obtaining an anonymized set of threat data from a first threat data source by processing threat data from the first threat data source by filtering confidential data from the threat data using a set of privacy rules from the first entity privacy ruleset;

populating a threat database with the anonymized set of threat data, wherein the threat data includes characteristics of security threats;

receiving a registration request for a user of a device;

assigning a unique user identifier for the user and unique device identifier for the device;

generating a threat model for the unique user identifier and a unique device identifier using a set of the characteristics from the threat database that correspond to the user and the device;

receiving a set of data access attributes for a data access request initiated using the unique user identifier and the unique device identifier for data from a data source of a second entity the set of data access attributes anonymized using a second entity privacy ruleset for the second entity;

blocking the data access request based on an evaluation of the data access attributes using the threat model; and updating the threat database with the anonymized data access attributes.

18. The method of claim 17, further comprising:

registering the first threat data source with the threat database via a data exchange protocol that defines security controls and privacy rules to be included in the set of privacy rules for obtaining threat data from the first threat data source; and importing data elements from the first threat data source, wherein populating the threat database includes adding the data elements to the threat database.

19. The method of claim 18, further comprising:

formatting the data elements using a set of data transformation rules to transform the data elements into a standardized data format.

20. The method of claim 19, wherein the set of data transformation rules include a rule defining a format for at least one of an originating entity, a threat data type, a timestamp that indicates when a threat included in the data elements was detected, and a timestamp that indicates an indication of a first instance of the threat.

21. The method of claim 18, further comprising:

evaluating existing data in the threat database to determine matched sets between members of the existing data and members of the data elements; and establishing linked data sets for the matched sets, wherein the threat model is generated in part by evaluating the linked data sets.

22. The method of claim 17, wherein the access request is a request for financial data from a financial institution.

23. The method of claim 17, further comprising:

transmitting a challenge response to a device initiating the data access request; and validating a response received in response to the challenge response;

upon validation of the response, completing the data access request; and updating the threat databased with data elements obtained from the data access request and the response.

24. The method of claim 17, further comprising transmitting a message to a user corresponding to the request indicating that the data access request has been blocked.

* * * * *

UNITED STATES PATENT AND TRADEMARK OFFICE
CERTIFICATE OF CORRECTION

PATENT NO. : 11,388,179 B2
APPLICATION NO. : 16/868194
DATED : July 12, 2022
INVENTOR(S) : Adams et al.

It is certified that error appears in the above-identified patent and that said Letters Patent is hereby corrected as shown below:

In the Claims

In Column 14, Line 1, in Claim 17, after "entity", insert --,--

Signed and Sealed this
Sixth Day of September, 2022

Katherine Kelly Vidal
*Director of the United States Patent and Trademark Office*